(12) United States Patent
Murai (10) Patent No.: US 10,922,976 B2
(45) Date of Patent: Feb. 16, 2021

(54) DISPLAY CONTROL DEVICE CONFIGURED TO CONTROL PROJECTION DEVICE, DISPLAY CONTROL METHOD FOR CONTROLLING PROJECTION DEVICE, AND VEHICLE

(71) Applicant: Toyota Jidosha Kabushiki Kaisha, Toyota Aichi-ken (JP)

(72) Inventor: Rie Murai, Chiba Chiba-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 120 days.

(21) Appl. No.: 16/179,032

(22) Filed: Nov. 2, 2018

(65) Prior Publication Data
US 2019/0189014 A1   Jun. 20, 2019

(30) Foreign Application Priority Data
Dec. 18, 2017 (JP) .............................. JP2017-242124

(51) Int. Cl.
*G08G 1/16* (2006.01)
*G08G 1/09* (2006.01)
*G02B 27/01* (2006.01)
*G08G 1/04* (2006.01)

(52) U.S. Cl.
CPC ......... *G08G 1/166* (2013.01); *G02B 27/0101* (2013.01); *G08G 1/04* (2013.01); *G08G 1/09* (2013.01); *G08G 1/163* (2013.01); *G08G 1/164* (2013.01)

(58) Field of Classification Search
CPC .......... G08G 1/166; G08G 1/163; G08G 1/09; G02B 27/0101
See application file for complete search history.

(56) References Cited

U.S. PATENT DOCUMENTS

| | | | |
|---|---|---|---|
| 2010/0253541 A1* | 10/2010 | Seder ..................... | G08G 1/165 340/905 |
| 2012/0314074 A1* | 12/2012 | Aimura ................... | G06T 7/593 348/148 |
| 2015/0203036 A1* | 7/2015 | Kajiwara .................. | B60R 1/00 345/7 |
| 2018/0174460 A1* | 6/2018 | Jung ...................... | B60Q 1/525 |
| 2018/0330619 A1* | 11/2018 | Shimizu ................. | G08G 1/166 |
| 2019/0071014 A1* | 3/2019 | Misu ................... | G06K 9/00805 |
| 2019/0204598 A1* | 7/2019 | Murai .................... | B60K 35/00 |

FOREIGN PATENT DOCUMENTS

JP       2013-120574 A       6/2013

* cited by examiner

*Primary Examiner* — Thomas G Black
*Assistant Examiner* — Tarek Elarabi
(74) *Attorney, Agent, or Firm* — Dinsmore & Shohl LLP (57) ABSTRACT

A display control device configured to control a projection device that projects an image on a windshield of a vehicle includes a circuitry. The circuitry is configured to determine a target ground object that is a ground object other than an object which a driver of the vehicle is to be warned of, the target ground object being used to provide the driver with a sense of distance to the object, and project, using the projection device, an image for indicating a presence of the object in a manner that allows the driver to perceive a sense of distance to the object on a windshield of the vehicle, such that a first part of the image and the target ground object overlap each other and a second part of the image and the target ground object do not overlap each other when viewed from the driver.

8 Claims, 6 Drawing Sheets

DISPLAY CONTROL DEVICE CONFIGURED TO CONTROL PROJECTION DEVICE, DISPLAY CONTROL METHOD FOR CONTROLLING PROJECTION DEVICE, AND VEHICLE

CROSS-REFERENCE TO RELATED APPLICATION

This application claims priority to Japanese Patent Application No. 2017-242124 filed on Dec. 18, 2017, the entire contents of which are incorporated herein by reference.

BACKGROUND

1. Technical Field

The disclosure relates to a display control device configured to control a projection device, a display control method for controlling a projection device, and a vehicle.

2. Description of Related Art

In a case where a pedestrian is present who may rush out to a host vehicle side from an invisible area caused by a vehicle parked diagonally in front of the host vehicle, a technique for displaying an image ahead of the host vehicle in a state in which an image of the parked vehicle displayed on an in-vehicle display is overlapped with an icon indicating the pedestrian (see, for example, Japanese Unexamined Patent Application Publication No. 2013-120574 (JP 2013-120574 A)).

SUMMARY

In the technique described above, since the image of the parked vehicle is displayed to be overlapped with the icon indicating the pedestrian, it may be difficult for a driver of the host vehicle to grasp the distance to the icon. For this reason, there is a possibility that the driver of the host vehicle may not be able to grasp a positional relationship between the parked vehicle and the pedestrian.

The disclosure provides a display control device, a display control method, and a vehicle allowing a driver to more easily grasp a positional relationship between a ground object and an object.

A first aspect of the disclosure provides a display control device configured to control a projection device configured to project an image on a windshield of a vehicle. The display control device includes a circuitry configured to: determine a target ground object that is a ground object other than an object which a driver of the vehicle is to be warned of, the target ground object being used to provide the driver with a sense of distance to the object; and project, using the projection device, an image for indicating a presence of the object in a manner that allows the driver to perceive the sense of distance to the object on the windshield of the vehicle, such that a first part of the image and the target ground object overlap each other and a second part and the target ground object do not overlap each other when viewed from the driver, the second part being a part of the image other than the first part.

According to the first aspect of the disclosure, the target ground object to be used to provide the driver of the vehicle with the sense of distance to the object, which the driver is to be warned of, is determined, and the image for indicating the presence of the object is projected in the manner that allows the driver to perceive the sense of distance to the object, such that the part of the image and the target ground object overlap each other and parts of the image other than the part and the target ground object do not overlap each other when viewed from the driver. Accordingly, with parts of the image that are not overlapped with the target ground object, the driver can easily grasp the distance to the image. Therefore, the driver can easily grasp the positional relationship between a ground object and the object.

In the display control device according to the first aspect of the disclosure, the circuitry may be configured to determine a ground object that is visible to the driver of the vehicle and positioned to be overlapped with the object when viewed from the driver of the vehicle, as the target ground object.

In the display control device according to the first aspect of the disclosure, the circuitry may be configured to cause the projection device to project the image in a size corresponding to a distance from the vehicle to the object.

In the display control device according to the first aspect of the disclosure, the circuitry may be configured to determine a ground object that is visible to the driver of the vehicle and positioned to be overlapped with the object that is moving toward a traveling road of the vehicle when viewed from the driver of the vehicle.

In the display control device according to the first aspect of the disclosure, the circuitry may be configured to, when the object moves from an overlapping position with the target ground object to a non-overlapping position with the target ground object when viewed from the driver, cause the projection device to project the image to follow a movement of the object.

In the display control device according to the first aspect of the disclosure, the circuitry may be configured to, when the object is overlapped with the target ground object in a manner in which the object is positioned on a back side of the target ground object when viewed from the driver, cause the projection device to project the image in a shape representing a type of the object.

A second aspect of the disclosure provides a display control method for controlling a projection device configured to project an image on a windshield of a vehicle. The display control method includes: determining a target ground object that is a ground object other than an object which a driver of the vehicle is to be warned of, the target ground object being used to provide the driver with a sense of distance to the object; and projecting, using the projection device, an image for indicating a presence of the object in a manner that allows the driver to perceive the sense of distance to the object on the windshield of the vehicle, such that a first pail of the image and the target ground object overlap each other and a second part of the image and the target ground object do not overlap each other when viewed from the driver, the second part being a part of the image other than the first part.

A third aspect of the disclosure provides a vehicle including the display control device.

According to the aspects of the disclosure, the driver can easily grasp the positional relationship between the ground object and the object.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
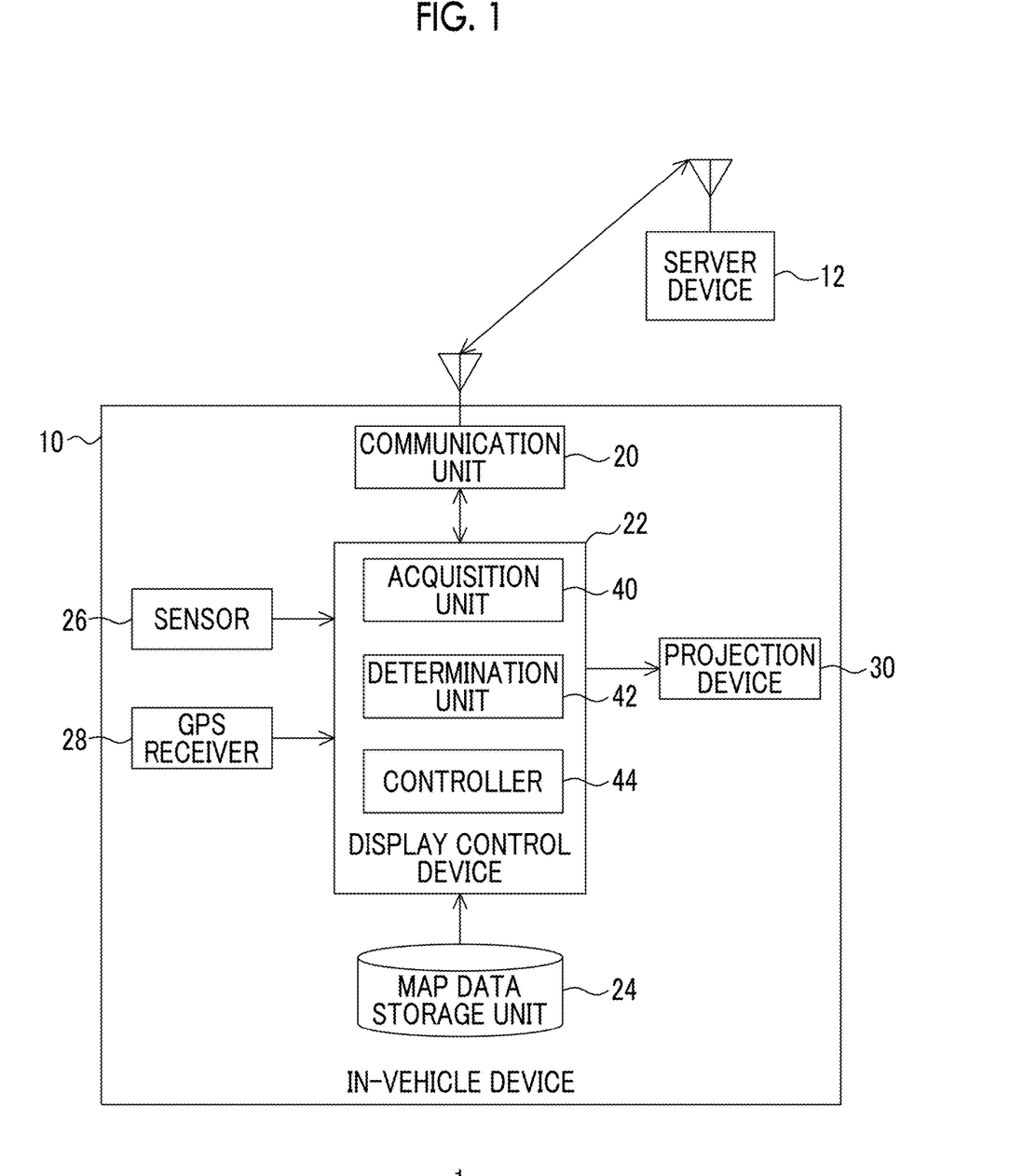
FIG. 1 is a block diagram of a configuration of a vehicle system according to an embodiment.

FIG. 1 is a block diagram of a configuration of a vehicle system 1 according to an embodiment. The vehicle system 1 includes an in-vehicle device 10 and a server device 12. The vehicle system 1 may include a plurality of in-vehicle devices 10.

The in-vehicle device 10 is mounted in a vehicle that is an automobile. The in-vehicle device 10 includes a communication unit 20, a display control device 22, a map data storage unit 24, a sensor 26, a global positioning system (GPS) receiver 28, and a projection device 30. The display control device 22 includes an acquisition unit 40, a determination unit 42, and a controller 44.

The map data storage unit 24 stores map data and information about ground objects. Examples of the ground object include a wall, a building, a signboard, and the like. The information about the ground object includes information such as the position of the ground object, the width of the ground object, the height of the ground object, and the like. The position of the ground object includes latitude and longitude.

The sensor 26 senses ground objects in front of a host vehicle such as a wall, a building, a signboard, a parked vehicle, or the like. The sensor 26 outputs information about the sensed ground object to the display control device 22. The information includes, for example, information about the distance from the host vehicle to the ground object, information about the width of the ground object, information about the height of the ground object, and the like. The sensor 26 includes a millimeter wave radar, a laser radar, a monocular camera, a stereo camera, and the like.

The GPS receiver 28 receives signals from a GPS satellite, and derives the current position of the host vehicle. The current position includes latitude and longitude. The GPS receiver 28 outputs the current position information of the host vehicle to the display control device 22. The display control device 22 outputs the current position information of the host vehicle to the communication unit 20.

The communication unit 20 performs wireless communication with the server device 12. The wireless communication standard is not particularly limited, but includes the third generation mobile communication system (3G), the fourth generation mobile communication system (4G) or the fifth generation mobile communication system (5G). The communication unit 20 may perform wireless communication with the server device 12 through a base station (not shown). The communication unit 20 transmits the current position information of the host vehicle, which has been output from the display control device 22, to the server device 12. In the current position information, information for identifying a vehicle as a transmission source is attached.

For example, the server device 12 is provided at a datacenter, and periodically receives image information transmitted from a plurality of cameras installed at a plurality of intersections with poor visibility or the like. As will be described later, the camera captures an image of an area of a back side of a ground object, the area invisible to a driver of a vehicle moving to the intersection with poor visibility or the like. The server device 12 periodically derives information about the object to be warned at the intersection with poor visibility or the like based on the image information of the camera. The information about the object includes position information about the object and information about the type of the object. The type of the object includes a pedestrian, bicycles, a motorcycle, a vehicle, or the like. The position of the object includes latitude and longitude.

In addition to, or in place of the image information, the server device 12 may receive position information of a mobile terminal, such as a smartphone, which a pedestrian or a bicyclist is carrying. Even in this case, the server device 12 periodically derives information about the object based on the received position information about the mobile terminal. The information about the object can be derived based on the image information of the camera and the position information of the mobile terminal using a known technology.

Based on the current position information received from the in-vehicle device 10, the server device 12 periodically transmits, to the in-vehicle device 10, information about the object to be warned around the host vehicle. Information for specifying the destination vehicle is attached to the information about the object.

The communication unit 20 periodically receives the information about the object to be warned around the current position of the host vehicle from the server device 12. The communication unit 20 outputs the received information about the object to the display control device 22.

The display control device 22 outputs control signals to the projection device 30 based on information about the ground object around the host vehicle, position information of the host vehicle, and information about the object to be warned around the host vehicle to control the projection device 30. The processing of the display control device 22 will be described in detail later.

The projection device 30 is what is called a head up display (HUD). The projection device 30 is mounted in a vehicle cabin of the host vehicle and projects images of various items of information on a windshield based on the control signals output from the display control device 22. The image is a virtual image. The virtual image projected on the windshield is not imaged on the windshield, and perceived by the driver as if the image is displayed outside the vehicle. Therefore, the virtual image is displayed so as to be overlapped with the real image in front of the vehicle. For this reason, the driver can obtain information contained in the virtual image with almost no movement of the line of sight during traveling of the vehicle. A well-known configuration can be employed for the projection device 30.

The display control device 22 will be described. The acquisition unit 40 periodically acquires information about ground objects around the host vehicle from the map data storage unit 24 and the sensor 26. The acquisition unit 40 periodically acquires current position information of the host vehicle from the GPS receiver 28. The acquisition unit 40 periodically acquires the information about the object to be warned around the host vehicle from the communication unit 20. The acquisition unit 40 outputs the acquired information to the determination unit 42.

The determination unit 42 determines the target ground object that is a ground object other than the object the driver of the host vehicle is to be warned of, in which the target ground object is the ground object to be used for providing the driver with a sense of distance to the object. The determination unit 42 determines the target ground object based on the information about the ground object, the current position information of the host vehicle, the information about the object, and a predetermined eye-point of the driver. Specifically, the determination unit 42 determines that a ground object is the target ground object, in which the ground object is visible to the driver of the host vehicle, and is positioned to be overlapped with the object that is moving to the traveling road of the host vehicle when viewed from the driver of the host vehicle. The target ground object is overlapped with the object on the front side or the back side of the object. The determination unit 42 may determine that a ground object is the target ground object, in which the ground object is visible to the driver of the host vehicle and is present in a direction of the line of sight of the driver who is to pass through the object moving to the traveling road of the host vehicle. The eye-point of the driver is set, for example, to a preset position in a vehicle cabin of the host vehicle. The eye-point of the driver may be detected based on a captured image of an in-cabin camera (not shown) that captures the face of the driver.

Figure 2:
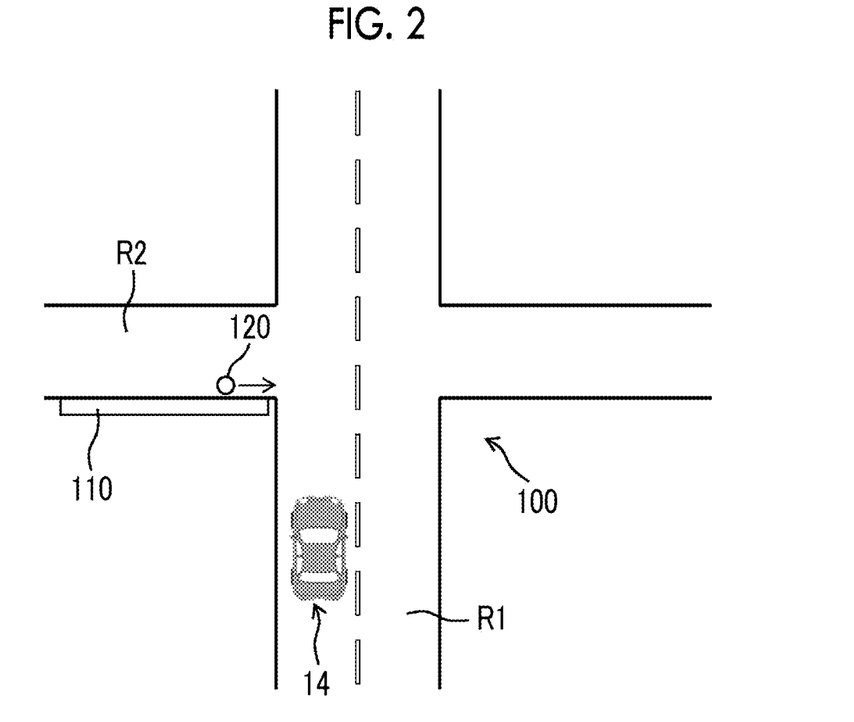
FIG. 2 is a diagram of a situation where a vehicle in which an in-vehicle device in FIG. 1 is mounted moves to an intersection.

FIG. 2 is a diagram of a situation where the vehicle 14 in which the in-vehicle device 10 in FIG. 1 is mounted moves to an intersection 100. At the intersection 100, a first road R1 and a second road R2 intersects. The vehicle 14 travels on the first road R1 toward the intersection 100. On the left side of the intersection 100 when viewed from the driver of the vehicle 14, there is a wall 110. The pedestrian 120 is moving along the wall 110 to the intersection 100 on the second road R2. Since the wall 110 is higher than the height of the pedestrian 120, the pedestrian 120 cannot be visually perceived by the driver of the vehicle 14. That is, the intersection 100 has poor visibility.

It is assumed that a camera is installed at a position where a range hidden by the wall 110 on the second road R2 can be captured (illustration thereof is omitted). The camera transmits the image information of the pedestrian 120 to the server device 12. As described above, the server device 12 derives the position information of the pedestrian 120, who is the object, and the information about the type of the object based on the image information of the camera, and transmits the derived information to the in-vehicle device 10.

In the example of FIG. 2, the determination unit 42 determines that the wall 110 is the target ground object, in which the wall 110 is visible to the driver of the vehicle 14 and is overlapped with the pedestrian 120 on the front side of the pedestrian 120 moving to the traveling road of the vehicle 14 when viewed from the driver of the vehicle 14.

When the determination unit 42 determines the target ground object, the controller 44 projects, using the projection device 30, image for indicating a presence of the object in a manner that allows the driver to perceive a sense of distance to the object on the windshield of the vehicle, such that a part of the image and the target ground object overlap each other and parts of the image other than the part and the target ground object do not overlap each other when viewed from the driver. That is, the controller 44 causes the projection device 30 to project the image for indicating the presence of the object as if it protrudes from the ground object when seen from the driver. The proportion of the image for indicating the presence of the object not being overlapped with the ground object can be appropriately decided by experiment, simulation, or the like.

When the determination unit 42 does not determine the target ground object, the controller 44 does not cause the projection device 30 to project the image for indicating the presence of the object.

The controller 44 causes the projection device 30 to project the image for indicating the presence of the object in a size corresponding to a distance from the vehicle to the object. The controller 44 causes the projection device 30 to project the image for indicating the presence of the object larger as the distance from the vehicle to the object is smaller. When the object is overlapped with the target ground object on the back side of the target ground object when viewed from the driver, the controller 44 causes the projection device 30 to project the image for indicating the presence of the object in such a size that the object is perceived as being positioned on the back side of the target ground object. When the object is overlapped with the target ground object on the front side of the target ground object when viewed from the drives; the controller 44 causes the projection device 30 to project the image for indicating the presence of the object m such a size that the object is perceived as being positioned on the front side of the target ground object.

When the object is overlapped with the target ground object on the back side of the target ground object when viewed from the driver, the controller 44 causes the projection device 30 to project the image of the shape representing a type of the object.

Figure 3:
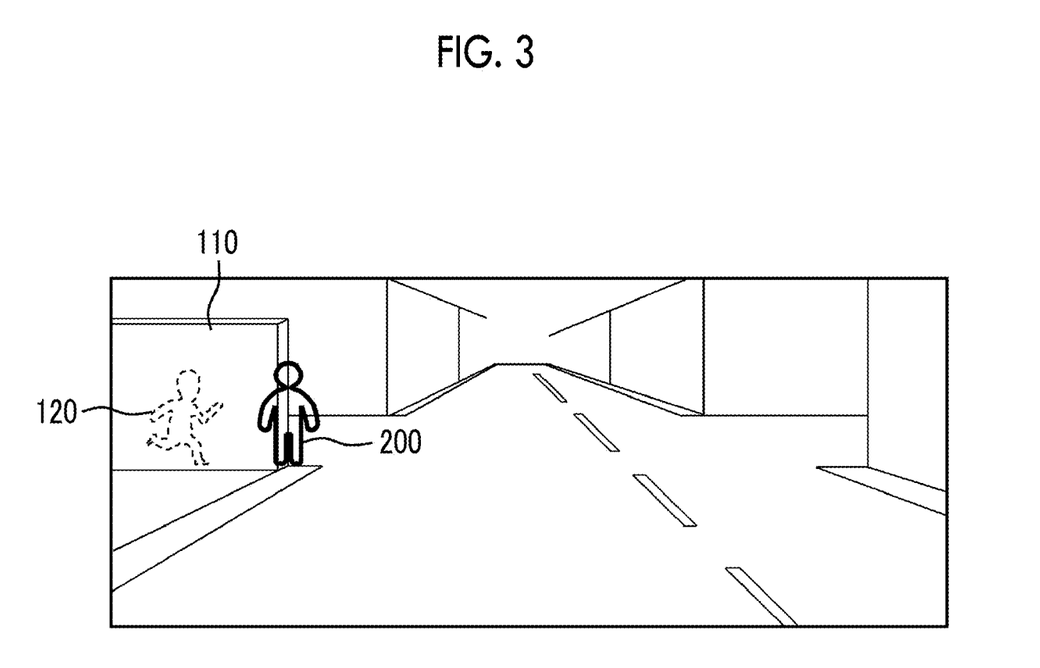
FIG. 3 is a schematic view of a real image in front of a driver and visually perceived by the driver of the vehicle of FIG. 2 and an image indicating a presence of an object.

FIG. 3 is a schematic view of a real image in front of the driver and visually perceived by the driver of the vehicle 14 of FIG. 2 and an image 200 for indicating the presence of the object. In FIG. 3, the object is a pedestrian 120, and the image 200 of the shape representing a pedestrian is projected. The image 200 is a closed curve resembling the outline of the object, and is not particularly limited thereto. The image 200 may be translucent. For example, when the type of the object is a bicycle, an image of a shape representing the bicycle is projected. When the type of the object is a vehicle, an image of a shape representing the vehicle is projected.

The driver easily compares the portion of the image 200, which looks as if it protrudes from the wall 110, with the wall 110, and thus the driver easily perceives the distance indicated by the image 200. For this reason, the driver easily perceives that the image 200 is positioned on the back side of the wall 110. Therefore, the driver easily perceives the pedestrian 120 positioned on the back side of the wall 110.

Figure 4:
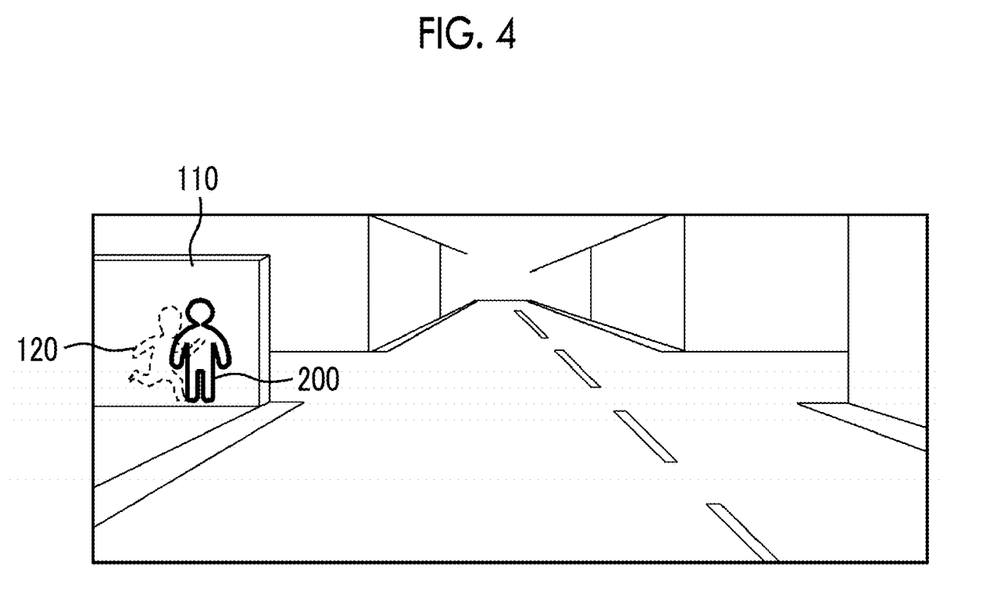
FIG. 4 is a schematic view of a real image in front of a driver and visually perceived by the driver of a vehicle and an image indicating a presence of an object according to a first comparative example.

Here, first and second comparative examples will be described. FIG. 4 is a schematic view of a real image in front of a driver and visually perceived by the driver of a vehicle and an image 200 indicating a presence of an object according to the first comparative example. The image 200 is displayed to be overlapped with a wall 110 in the vicinity of a pedestrian 120. In the display described above, even when the size of the image 200 is adjusted so as to indicate that the pedestrian 120 is positioned on the back side of the wall 110, the image 200 is perceived as if the image 200 is sticking to the wall 110. That is, in the first comparative example, it is difficult for the driver to perceive the distance to the image 200, which makes the driver tired.

Figure 5:
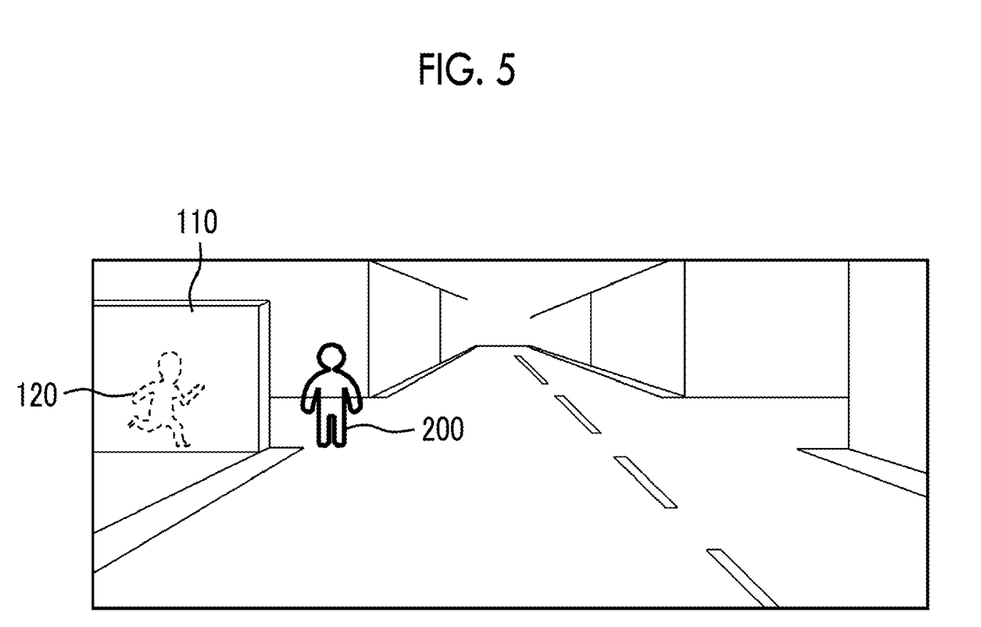
FIG. 5 is a schematic view of a real image in front of a driver and visually perceived by the driver of a vehicle and an image indicating a presence of an object according to a second comparative example.

FIG. 5 is a schematic view of a real image in front of a driver and visually perceived by the driver of a vehicle and an image 200 indicating a presence of an object according to the second comparative example. In FIG. 5, the image 200 is displayed such that any portion of the image 200 is not overlapped with the wall 110. In the second comparative example, the driver perceives the distance indicated by the image 200 relatively difficulty compared with the example in FIG. 3. In fact, the pedestrian 120 does not rush out to the road, but there is a possibility that the driver misperceives that the pedestrian 120 rushes out to the road. In the example of FIG. 3, some portion of the image 200 is overlapped with the wall 110. Therefore, it is easy for the driver to perceive that the pedestrian 120 is overlapped with the wall 110, and it is difficult for the driver to misperceive that the pedestrian 120 rushes out to the road.

Figure 6:
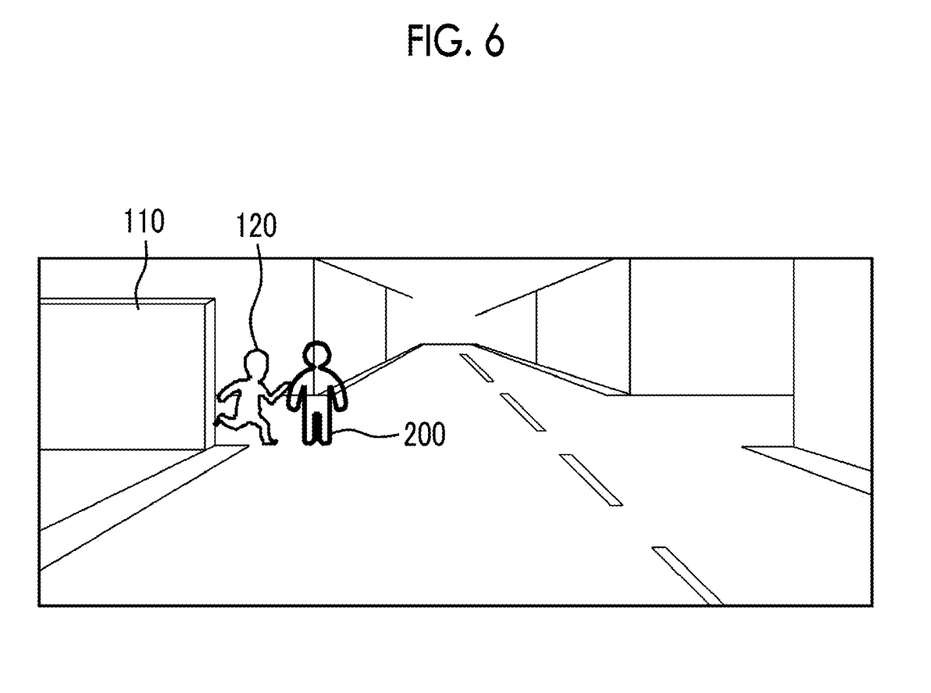
FIG. 6 is a schematic view of a real image in front of a driver and visually perceived by the driver of the vehicle of FIG. 2 and the image indicating the presence of the object, following FIG. 3.

FIG. 6 is a schematic view of the real image in front of the driver and visually perceived by the driver of the vehicle 14 of FIG. 2 and the image 200 indicating the presence of the object, following FIG. 3. Over time from the situation in FIG. 3, the pedestrian 120 is rushing out from the wall 110 to the road.

When the object is moved from the position where the object is overlapped with the target ground object to the position where the object is not overlapped with the target ground object when viewed from the driver, the controller 44 causes the projection device 30 to project the image 200 indicating the presence of the object to follow the movement of the object. That is, during the presence at the position where the object is overlapped with the target ground object when viewed from the driver, the image 200 does not move, even when the object moves. When the object moves to a position where the object is not overlapped with the target ground object when viewed from the driver, the image 200 also moves as the object moves. In this case, the image 200 is displayed so as not to disturb the visibility of the object by the driver. For example, the image 200 may be displayed to surround the object, or may be displayed so as not to be overlapped with the object, for example, by deviating from the moving direction of the object. When the host vehicle passes through the target ground object, the controller 44 causes the projection device 30 to erase the image 200 of the object.

Figure 7:
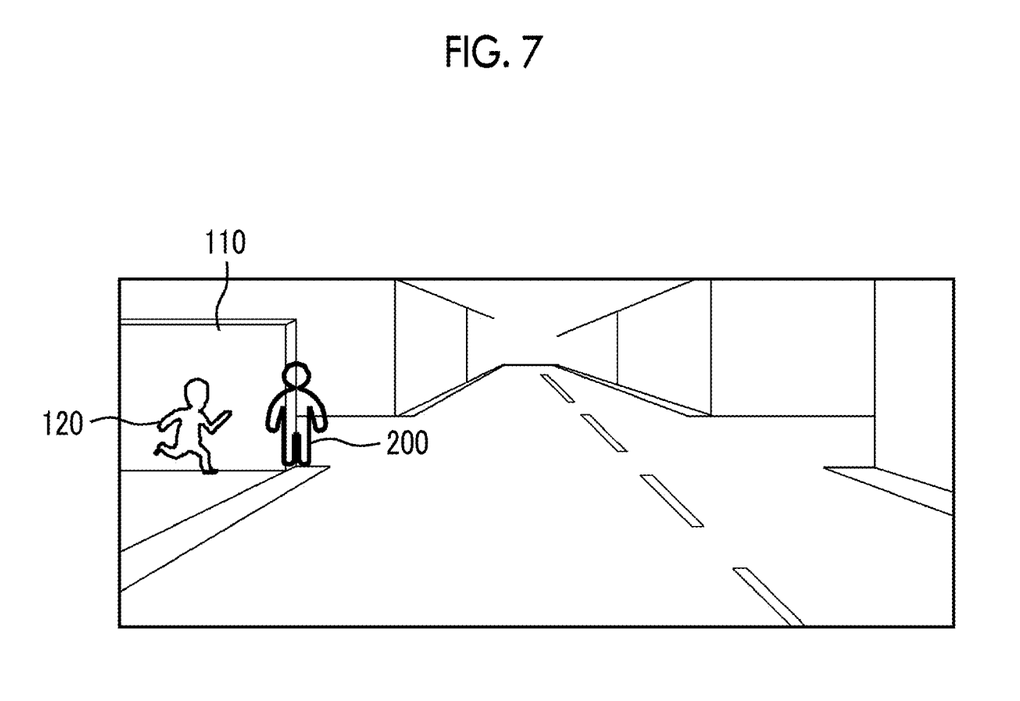
FIG. 7 is a schematic view of a real image in front of a driver and visually perceived by the driver of the vehicle and the image indicating a presence of an object when a pedestrian is present on a front side of a wall.

FIG. 7 is a schematic view of a real image in front of the driver and visually perceived by the driver of the vehicle 14 and the image 200 indicating the presence of the object when the pedestrian 120 is present on a front side of the wall 110. The determination unit 42 determines that the wall 110, which is overlapped with the pedestrian 120 moving to the traveling road of the vehicle 14 on the back side of the pedestrian 120 when viewed from the driver of the vehicle 14, is the target ground object. The controller 44 causes the projection device 30 to project the image 200 indicating the presence of the object as if it protrudes from the wall 110.

In the example in FIG. 7, the driver easily compares the portion of the image 200, which looks as if it protrudes from the wall 110, with the wall 110, and thus the driver easily perceives the distance indicated by the image 200. For this reason, the driver easily perceives that the image 200 is positioned on the front side of the wall 110.

Although the driver can visually perceive the pedestrian 120 who is present on the front side of the wall 110, there is a possibility that the pedestrian 120 is not noticed when the speed of the host vehicle is relatively high. Even in the above-mentioned situation, with the image 200, it is possible to appropriately warn the driver.

When the object is overlapped with the target ground object on the front side of the target ground object when viewed from the driver, the controller 44 may cause the projection device 30 to project the image of the same shape regardless of the type of the object. In this case, the driver can visually perceive the object and grasp the type of the object.

Even when a pedestrian or the like is present on the back side of the parked vehicle, the in-vehicle device 10 can display the image 200 indicating the presence of the object such that the image 200 looks as if it protrudes from the parked vehicle. In this case, the server device 12 derives the position information of the pedestrian present on the back side of the parked vehicle based on the position information transmitted from a smartphone or the like that the pedestrian is carrying.

The configuration described above can be implemented by a central processing unit (CPU), a memory, and other large-scale integrations (LSI) of a computer in terms of hardware, and can be implemented by a program, or the like loaded in the memory, in terms of software. However, in this case, functional blocks implemented by co-operation of the above-described constituent elements are drawn. Therefore, those skilled in the art will appreciate that these functional blocks can be implemented in various forms by hardware, by software, or a combination of hardware and software.

Figure 8:
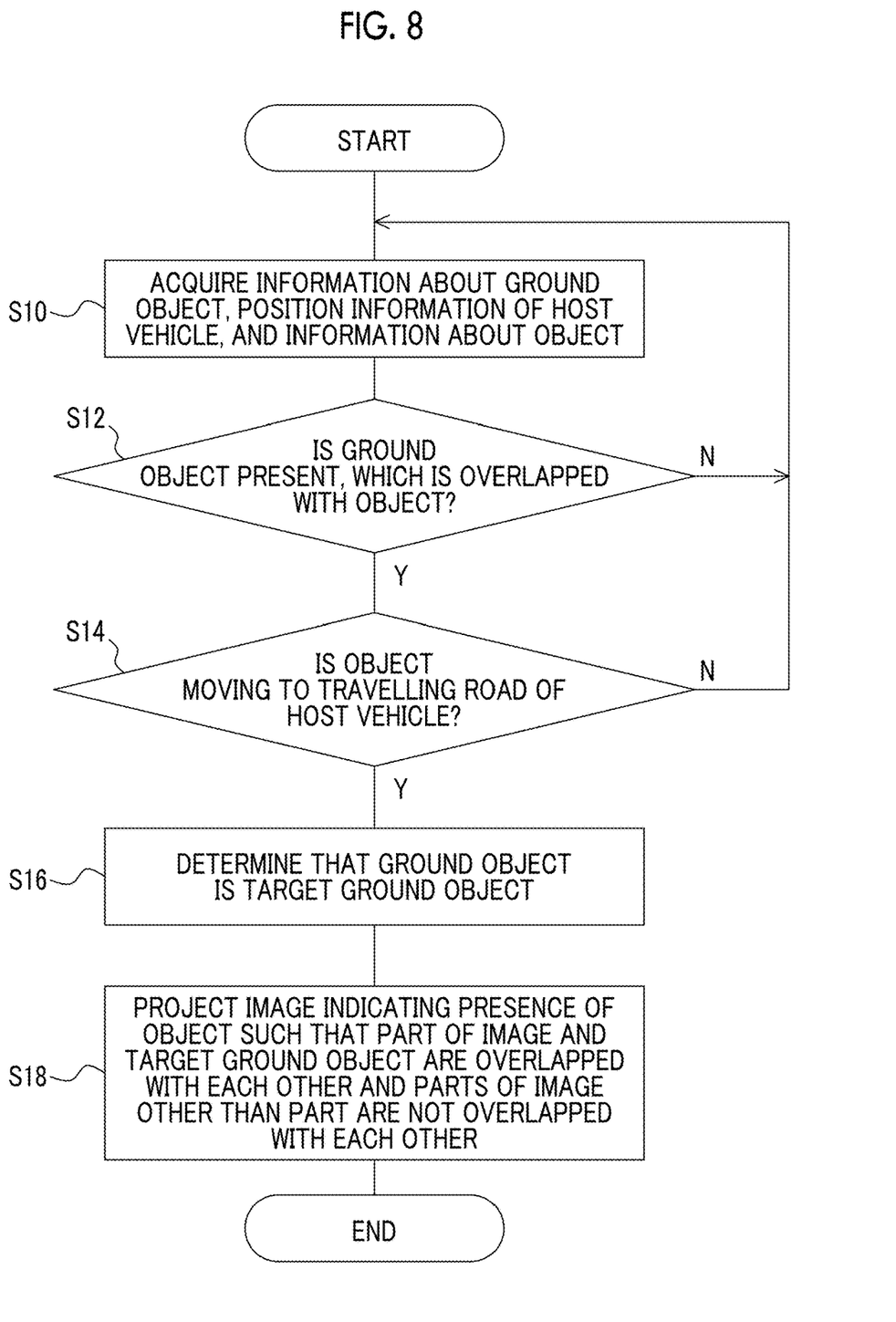
FIG. 8 is a flowchart showing a display process of an image indicating a presence of an object m the display control device of FIG. 1.

Overall operations of the display control device 22 according to the above configuration will be described. FIG. 8 is a flowchart showing a display process of an image indicating a presence of an object in the display control device 22 of FIG. 1. The process in FIG. 8 is repeated.

The acquisition unit 40 acquires information about the ground object, position information of the host vehicle, and information about the object to be warned (S10). When the ground object is not present, which is visible to the driver of the host vehicle and is overlapped with the object when viewed from the driver of the host vehicle (N in S12), the process returns to step S10 When the ground object is present, which is visible to the driver of the host vehicle and is overlapped with the object when viewed from the driver of the host vehicle (Y in S12), if the object is not moving to the traveling road of the host vehicle (N in S14), the process returns to step S10. When the object is moving to the traveling road of the host vehicle (Y in S14), the determination unit 42 determines that the ground object is the target ground object (S16). The controller 44 causes the projection device 30 to project the image indicating the presence of the object such that a part of the image and the target ground object are overlapped with each other, and parts of the image other than the part and the target ground object are not overlapped with each other when viewed from the driver (S18), and end the process.

According to the embodiment described above, a target ground object is determined, in which the target ground object is to be used to provide the driver of the vehicle with a sense of distance to the object which the driver is to be warned of, and an image for indicating a presence of the object in a manner that allows the driver to perceive a sense of distance to the object is projected on a windshield of the vehicle such that a part of the image and the target ground object overlap each other and parts of the image other than the part and the target ground object do not overlap each other when viewed from the driver. For this reason, the driver can easily grasp the distance to the image by the parts of the image not being overlapped with the target ground object. Therefore, the driver can easily grasp the positional relationship between the ground object and the object.

Since the image is projected in a size corresponding to the distance from the vehicle to the object, the driver can more easily grasp the distance to the image. Determination is made that the ground object positioned so as to be overlapped with the object moving to the traveling road of the vehicle when viewed from the driver of the vehicle is the target ground object. Therefore it is possible to display the image in the situation where the object is moving toward the vehicle and the driver is to be warned.

When the object is moved from the position where the object is overlapped with the target ground object to the position where the object is not overlapped with the target ground object when viewed from the driver, the image is projected to follow the movement of the object. In this way, the driver can be appropriately warned of a situation that has to pay more attention, such as the object approaching the vehicle.

When the object is overlapped with the ground object on the back side of the target ground object when viewed from the driver, the image of the shape representing the type of the object is projected. Therefore, the driver can grasp the type of the object even in the situation where the driver cannot visually perceive the object.

The disclosure has been described above based on the embodiment. It is to be understood by those skilled in the art that the embodiment is merely an example, and that various modifications can be made to the combination of respective constituent elements or respective processes and the modifications are also within the scope of the disclosure.

Figure 9:
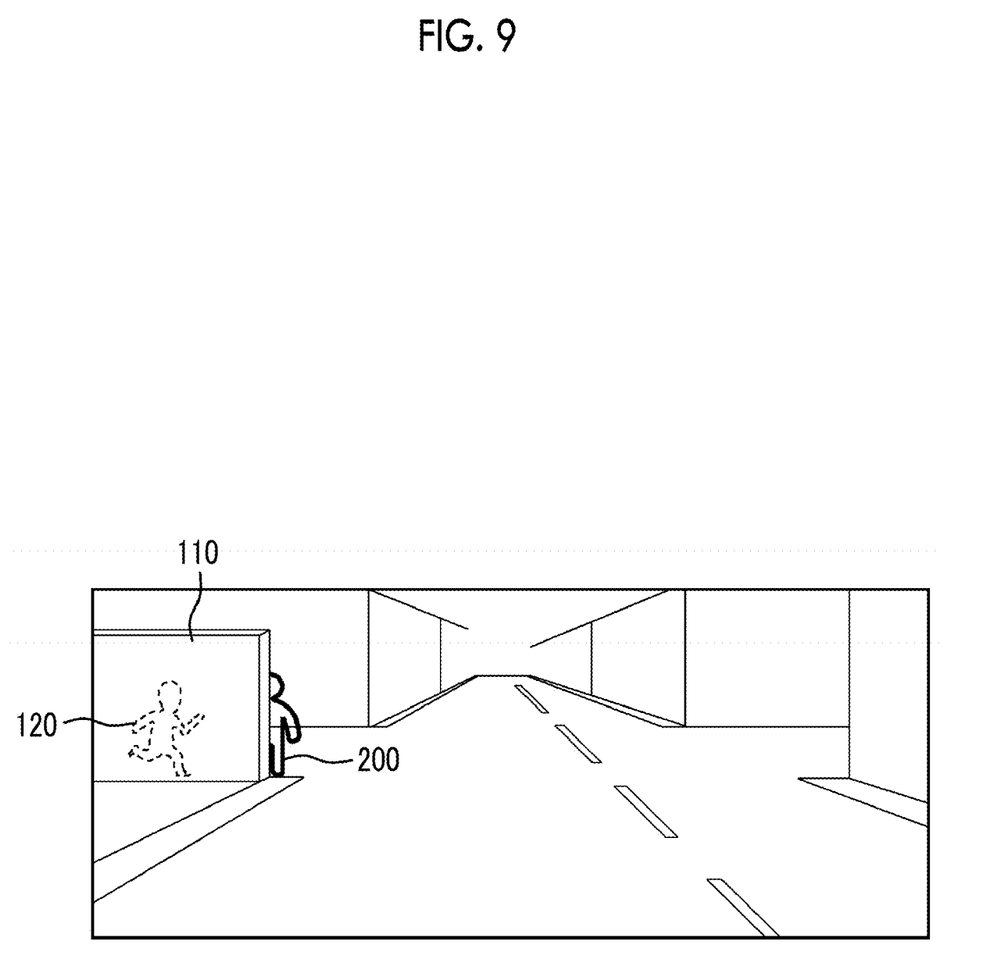
FIG. 9 is a schematic view of a real image in front of a driver and visually perceived by the driver of the vehicle of FIG. 2 and an image indicating a presence of an object according to a modified example.

For example, the manner in which the image 200 indicating the presence of the object looks as if it protrudes from the target ground object may be changed. FIG. 9 is a schematic view of a real image in front of the driver and visually perceived by the driver of the vehicle 14 of FIG. 2 and an image 200 indicating a presence of an object according to a modified example. The pedestrian 120 is present on the back side of the wall 110 when viewed from the driver. Even in the above example, the image 200 looks as if it protrudes from the wall 110. However, the image 200 is not overlapped with the wall 110. That is, the image 200 is perceived such that some portion of the image 200 looks as if it protrudes from the wall 110 on the back side of the wall 110. For this reason, the controller 44 does not have to cause the projection device 30 to project the image 200 in a size corresponding to the distance from the vehicle to the object. Even in the above modified example, it is possible to obtain the effects of the embodiment.

The map data storage unit 24 may be provided in the server device 12, instead of being provided in the in-vehicle device 10. In the modified example described above, the configuration of the in-vehicle device 10 can be simplified.

What is claimed is:

1. A display control device configured to control a projection device, the projection device being configured to project an image of a simulated object on a windshield of a vehicle, the display control device comprising a circuitry configured to:
   determine a target ground object that is a ground object other than an object which a driver of the vehicle is to be warned of, the target ground object being used to provide the driver with a sense of distance to the object; and
   project, using the projection device, the image of the simulated object illustrating a simulated shape of the object on the windshield of the vehicle while an entirety of the object is blocked by the target ground object when viewed from the driver of the vehicle, such that a first part of the image of the simulated object and the target ground object overlap each other and a second part of the image of the simulated object and the target ground object do not overlap each other when viewed from the driver, the second part being a part of the image other than the first part.

2. The display control device according to claim 1, wherein
   the circuitry is configured to determine the ground object that is visible to the driver of the vehicle and positioned to be overlapped with the object when viewed from the driver of the vehicle, as the target ground object.

3. The display control device according to claim 1, wherein
   the circuitry is configured to cause the projection device to project the image of the simulated object in a size corresponding to a distance from the vehicle to the object.

4. The display control device according to claim 1, wherein
   the circuitry is configured to determine the ground object that is visible to the driver of the vehicle and positioned to be overlapped with the object that is moving toward a traveling road of the vehicle when viewed from the driver of the vehicle.

5. The display control device according to claim 1, wherein
   the circuitry is configured to, when the object moves from an overlapping position with the target ground object to a non-overlapping position with the target ground object when viewed from the driver, cause the projection device to project the image of the simulated object to follow a movement of the object.

6. The display control device according to claim 1, wherein
   the circuitry is configured to, when the object is overlapped with the target ground object in a manner in which the object is positioned on a back side of the target ground object when viewed from the driver, cause the projection device to project the image of the simulated object in a shape representing a type of the object.

7. A vehicle comprising the display control device according to claim 1.

8. A display control method for controlling a projection device, the projection device being configured to project an image of a simulated object on a windshield of a vehicle, the display control method comprising:
   determining a target ground object that is a ground object other than an object which a driver of the vehicle is to be warned of, the target ground object being used to provide the driver with a sense of distance to the object;

projecting, using the projection device, the image of the simulated object illustrating a simulated shape of the object on the windshield of the vehicle, such that a first part of the image of the simulated object and the target ground object overlap each other and a second part of the image of the simulated object and the target ground object do not overlap each other when viewed from the driver, the second part being a part of the image of the simulated object other than the first part; and adjusting a size of the simulated object based on a change of a distance from the vehicle to the object.

\* \* \* \* \*

UNITED STATES PATENT AND TRADEMARK OFFICE
CERTIFICATE OF CORRECTION

PATENT NO. : 10,922,976 B2
APPLICATION NO. : 16/179032
DATED : February 16, 2021
INVENTOR(S) : Rie Murai Page 1 of 1

It is certified that error appears in the above-identified patent and that said Letters Patent is hereby corrected as shown below:

In the Specification

Column 2, Line(s) 53, delete "pail" and insert --part--, therefor.

Column 3, Line(s) 29, delete "object m" and insert --object in--, therefor.

Column 6, Line(s) 44, delete "object m" and insert --object in--, therefor.

Column 8, Line(s) 53, delete "S10 When" and insert --S10. When--, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*